(12) United States Patent  
Boggess et al.

(10) Patent No.: US 7,641,221 B2
(45) Date of Patent: Jan. 5, 2010

(54) IMPACT ABSORBING AIRBAG INFLATOR

(75) Inventors: Brian Boggess, Dublin, OH (US); Grant Foreman, Marysville, OH (US); Skye Malcolm, Upper Arlington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/244,443

(22) Filed: Oct. 2, 2008

(65) Prior Publication Data

US 2009/0026739 A1 Jan. 29, 2009

Related U.S. Application Data

(63) Continuation of application No. 11/279,351, filed on Apr. 11, 2006, now Pat. No. 7,448,642.

(51) Int. Cl.
*B60R 21/16* (2006.01)

(52) U.S. Cl. .................................. 280/728.2

(58) Field of Classification Search ............. 280/728.2, 280/732, 728.3
See application file for complete search history.

(56) References Cited

U.S. PATENT DOCUMENTS

| | | | |
|---|---|---|---|
| 5,295,707 A | 3/1994 | Satoh et al. | |
| 5,405,163 A | 4/1995 | Amamori et al. | |
| 5,496,059 A | 3/1996 | Bauer | |
| 5,511,819 A | 4/1996 | Spilker et al. | |
| 5,533,747 A | 7/1996 | Rose | |
| 5,588,675 A | 12/1996 | Lotspih | |
| 5,775,723 A | 7/1998 | Dede et al. | |
| 5,791,684 A | 8/1998 | Repp et al. | |
| 6,279,942 B1 | 8/2001 | Bossenmaier et al. | |
| 6,296,277 B1 | 10/2001 | Bittinger et al. | |
| 6,312,008 B1 | 11/2001 | Neag | |
| 6,702,318 B2 | 3/2004 | Rose et al. | |
| 6,854,760 B2 | 2/2005 | Whited et al. | |
| 6,854,761 B2 | 2/2005 | Dietrich | |
| 6,951,348 B2 | 10/2005 | Enders | |
| 7,156,415 B2 | 1/2007 | Gray et al. | |
| 7,448,642 B2 | 11/2008 | Boggess et al. | |
| 2005/0087967 A1 | 4/2005 | DePottey et al. | |

OTHER PUBLICATIONS

Information Disclosure Statement filed Feb. 28, 2007 in U.S. Appl. No. 11/279,351.
Office Action mailed Sep. 6, 2007 in U.S. U.S. Appl. No. 11/279,351.
Amendment filed Dec. 5, 2007 in U.S. U.S. Appl. No. 11/279,351.

(Continued)

*Primary Examiner*—Faye M. Fleming
(74) *Attorney, Agent, or Firm*—Plumsea Law Group, LLC; Mark E. Duell

(57) ABSTRACT

An impact absorbing airbag module is disclosed. The module includes a chassis that holds an inflator, and is connected to a mounting system. The chassis includes a forward side wall, a first lateral side wall, a second lateral side wall, and a rear side wall. One of the side walls includes a deforming zone that includes a first angled portion and a second angled portion. In some cases, the deforming zone extends around the periphery of the chassis.

20 Claims, 12 Drawing Sheets

OTHER PUBLICATIONS

Information Disclosure Statement filed Dec. 22, 2007 in U.S. Appl. No. 11/279,351.
Final Office Action mailed Apr. 2, 2008 in U.S. U.S. Appl. No. 11/279,351.
Amendment filed Jun. 19, 2008 in U.S. U.S. Appl. No. 11/279,351.
Notice of Allowance mailed Jul. 11, 2008 in U.S. Appl. No. 11/279,351.
International Search Report and Written Opinion, mailed Nov. 27, 2007, from PCT Application Number PCT/US2007/066397.

IMPACT ABSORBING AIRBAG INFLATOR

CROSS REFERENCE TO RELATED APPLICATION

This application is a continuation of U.S. Pat. No. 7,448,642, currently U.S. application Ser. No. 11/279,351, entitled "Impact Absorbing Airbag Inflator", filed on Apr. 11, 2006 and allowed on Jul. 11, 2008.

BACKGROUND

The present invention relates generally to motor vehicles, and in particular the present invention relates to an impact absorbing airbag module.

In order to meet current safety regulations, most modern motor vehicles include some form of supplemental restraint system. These systems often include an airbag. Airbags are generally contained in a housing with a suitable inflator. This complete system is sometimes referred to as an airbag module. During an impact, the inflator quickly releases compressed gasses to inflate the airbag, which is deployed by the gasses. In the deployed condition, airbags are designed to cushion the impact experienced by the driver or passengers.

While airbag systems can be helpful during some types of collisions, there are some other collisions where the motor vehicle may have difficulty passing certain government mandated crash test requirements because passengers or drivers may impact the airbag module itself. These collisions generally occur at low speeds or low impact impulses where airbags are not designed to deploy. In these types of collisions, occupant impact with airbag modules can cause compliance problems with government mandated crash tests. To avoid this, the following airbag systems have been proposed.

U.S. Pat. No. 6,312,008 to Neag and assigned to Daimler Chrysler Corporation is directed to an energy absorbing bracket for an airbag system. Neag discloses a side airbag that is deployed with generally less force than a frontal airbag. The airbag module of Neag includes an energy absorption bracket 40 with upper downstanding leg 46 and lower downstanding leg 48. These downstanding legs are designed to bend when the airbag module experiences an impact.

U.S. Pat. No. 6,296,277 to Bittinger et al. and assigned to Chrysler Corporation is directed to a passenger restraint system with a crush zone. The '277 patent teaches crush zones 32 and 34 disposed on end caps 16 that are designed to absorb the impact of a passenger's knees during a collision. However, the end caps 16 of Bittinger are not part of the airbag.

U.S. Pat. No. 6,279,942 to Bossenmaier et al. and assigned to Daimler Chrysler Corporation is directed to a deformable air bag housing. The '942 patent provides a good background discussion of deformable air bag housings and notes that prior deformable air bag housings presented sharp corners or edges after deformation. These sharp corners could tear or snag a deploying air bag. The '942 patent discloses a deformable airbag housing that is designed to minimize damage to the airbag during inflation. To accomplish this, the '942 patent discloses a slot 15 that runs nearly the entire width of side cover 8. Slot 15 divides side cover 8 into two parts 16 and 17 as shown in cross-sectional views A-A and B-B. Upper part 16 includes a slightly bent lower edge that allows upper part 16 to slide outward of lower part 17 as side cover 8 deforms.

The following patents disclose air bag modules with collapsible side walls. Generally, some feature or provision is provided so that a portion of the side wall is weakened and assists in promoting deformation of the side wall at that weakened region.

U.S. Pat. No. 5,791,684 to Repp et al. and assigned to Morton International and Chrysler Corporation teaches an air bag canister with grooves of various cross-sectional shapes. U.S. Pat. No. 5,533,747 to Rose and assigned to Morton International discloses the use of slots 40 to provide a weakened region. Rose also teaches a "zigzag" shaped side walls 28 and 30. U.S. Pat. No. 5,405,163 to Amamori et al. and assigned to Tanaka Corporation teaches a side wall that includes stress concentration portions 61 to assist the air bag container in deforming. Finally, referring to FIGS. 16 and 17, related art air bag inflator module 2000, designed to use a cylindrical inflator 2008, includes walls 2002 and 2004 with perforations 2006. These perforations 2006 can assist air bag inflator module 2000 in deforming.

While the related art teaches a variety of features that can be used to reduce the severity of an impact with an airbag module, none of the references teaches an airbag module that is easy to design and manufacture, that is easy to tune and configure for different motor vehicles, different locations and different types of collisions, and an airbag module that can reduce the possibility of tearing an airbag during deployment.

SUMMARY OF THE INVENTION

An impact absorbing airbag module is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In one aspect, the invention includes an inflatable restraint module configured for mounting in an interior of a motor vehicle comprising: a chassis retaining an inflator, and connected to a mounting system; the chassis including a forward side wall, a first lateral side wall, a second lateral side wall, and a rear side wall; wherein the forward side wall is disposed at an angle with respect to the first lateral side wall; the forward side wall including a forward deforming zone disposed between an upper portion of the forward side wall and a lower portion of the forward side wall; and wherein the forward deforming zone includes a first angled portion and a second angled portion.

In another aspect, the upper portion of the forward side is generally more rigid than the forward deforming zone.

In another aspect, wherein a first bend is disposed between the upper portion of the forward side and the first angled portion, and a second bend is disposed between the first angled portion and the second angled portion.

In another aspect, a plurality of holes are disposed on the second bend.

In another aspect, the first lateral side wall includes a first lateral upper portion and a first lateral deforming zone.

In another aspect, the first lateral deforming zone is located in a similar vertical position as the forward deforming zone.

In another aspect, the second lateral side wall includes a second lateral upper portion and a second lateral deforming zone.

In another aspect, the first lateral deforming zone, the second lateral deforming zone and the forward lateral deforming zone are located in substantially the same plane.

In another aspect, the invention includes an inflatable restraint module configured for mounting in an interior of a motor vehicle comprising: a chassis retaining an inflator, and connected to a mounting system; the chassis including a first wall and a second wall, angled with respect to the first wall;

the first wall including a first deforming zone with first and second ends; the second wall including a second deforming zone with first and second ends; and wherein the first end of the first side wall is adjacent to the first end of the second side wall; and wherein the first end of the first side wall has a generally similar axial position with respect to the chassis as the first end of the second side wall.

In another aspect, the second side wall includes a generally straight deforming zone.

In another aspect, the second side wall includes a deforming zone including an angle.

In another aspect, one wall is generally rigid.

In another aspect, an upper portion of the first wall is generally more rigid than the first deforming zone.

In another aspect, an upper portion of the second wall is generally more rigid than the second deforming zone.

In another aspect, the first deforming zone and the second deforming zone are located in substantially the same plane.

In another aspect, the plane is generally normal with respect to an axis of the chassis.

In another aspect, the plane is generally angled with respect to an axis of the chassis.

In another aspect, the first deforming zone includes a first bend disposed between an upper portion of the first wall and a first angled portion, and a second bend is disposed between the first angled portion and a second angled portion.

In another aspect, the first deforming zone includes a third bend disposed between a lower portion of the first wall and the second angled portion.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
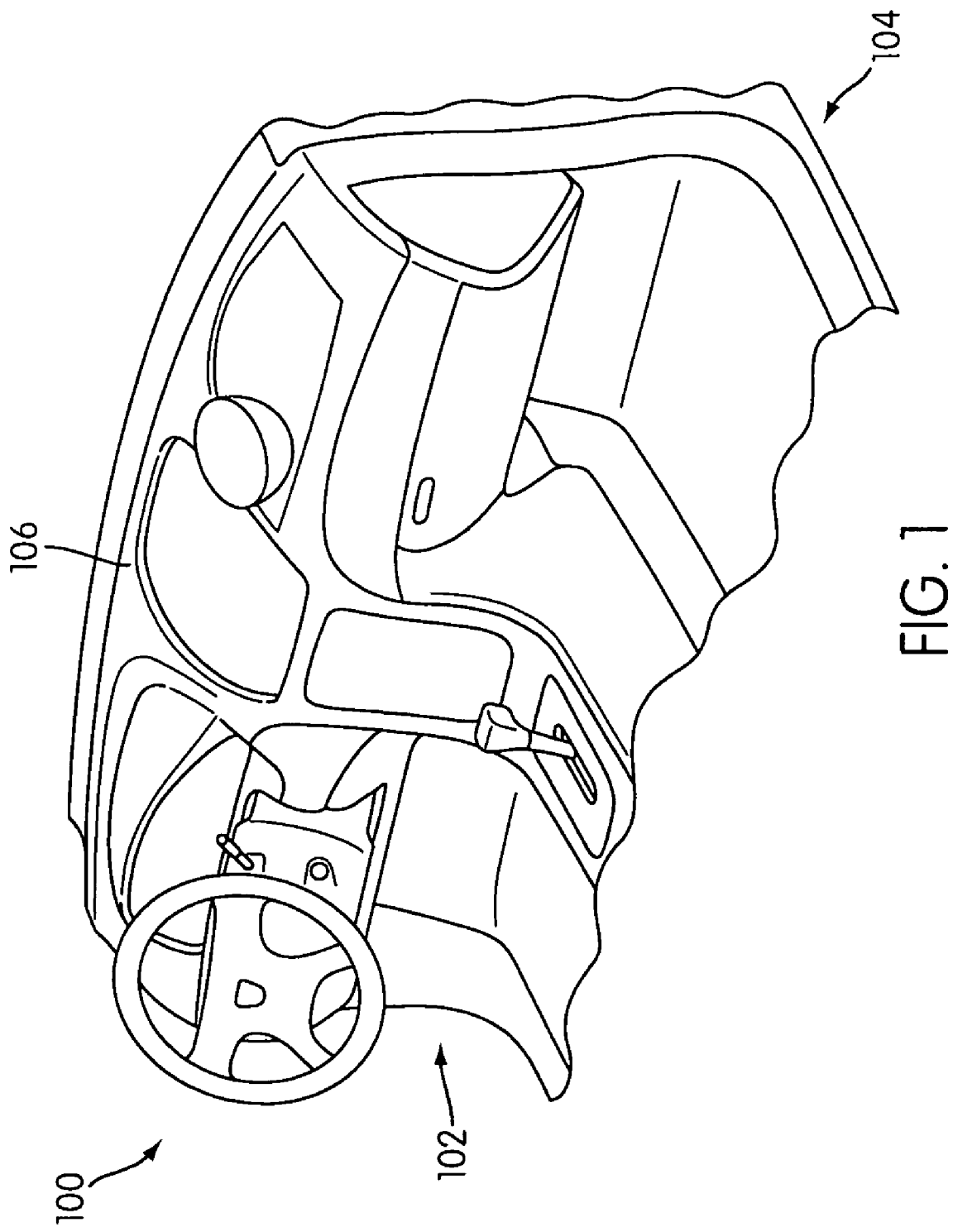
FIG. 1 is a schematic diagram of a preferred embodiment of a motor vehicle interior.

FIG. 1 is a schematic diagram of a motor vehicle interior 100. Motor vehicle interior 100 includes a driver side 102 and a passenger 104. Instrument panel 106 is disposed in motor vehicle interior 100 in a position generally forward of the driver and passenger. Instrument panel 106 spans across motor vehicle interior 100.

Figure 2:
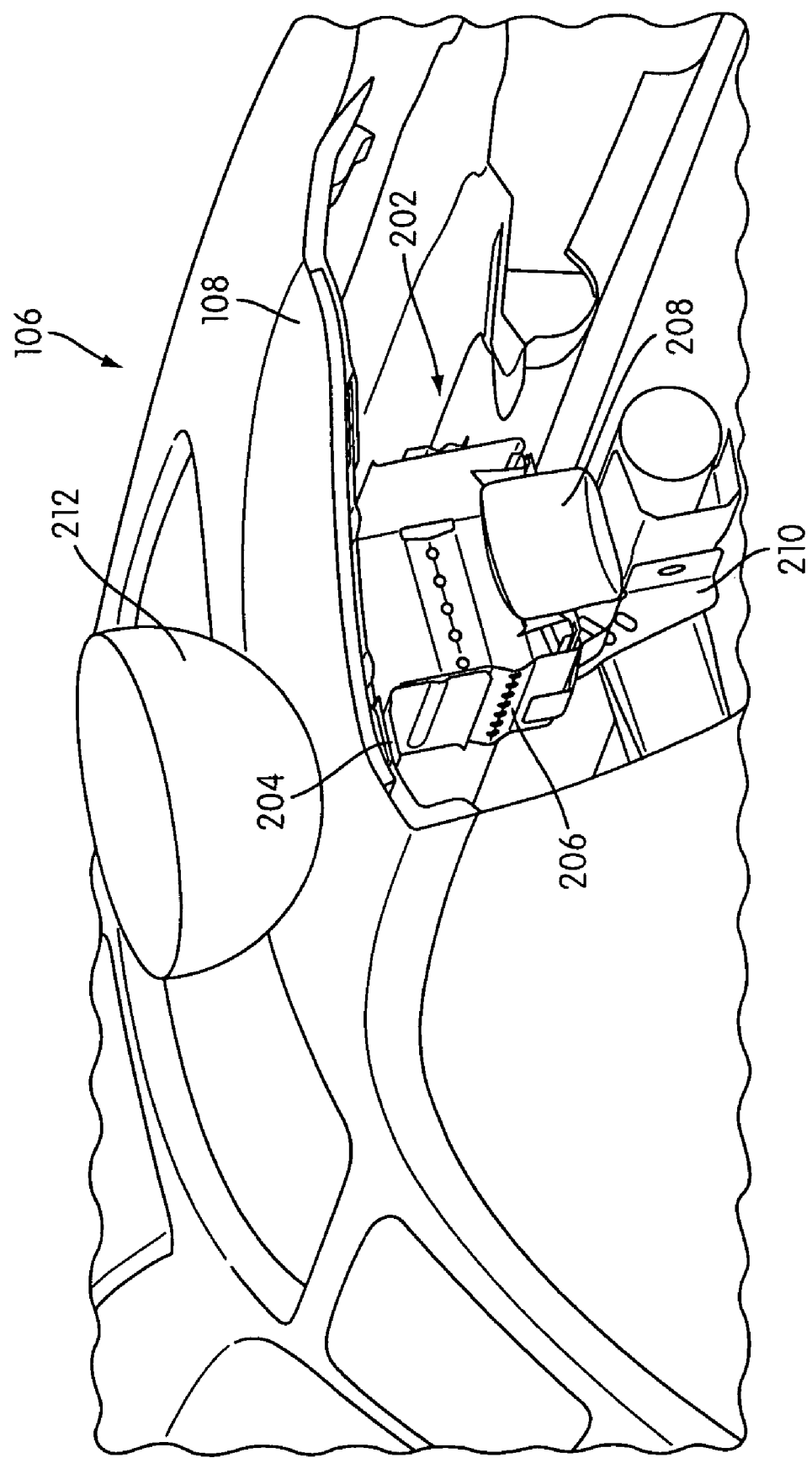
FIG. 2 is a cut-away schematic view of a preferred embodiment of a passenger side portion motor vehicle interior.

FIG. 2 is a schematic cross-sectional view of the passenger side portion 108 of instrument panel 106. Disposed proximate passenger side portion 108 of instrument panel 106 is a Supplemental Restraint System (SRS) module 202. SRS module 202 includes an upper mounting system 204 that associates SRS module 202 with passenger side portion 108 of instrument panel 106. SRS module 202 also includes a chassis 206 that retains or holds an inflator 208 and a lower mounting system 210. In a preferred embodiment, inflator 208 is a disk-type inflator. A hypothetical impact 212 is also shown in FIG. 2. Hypothetical impact 212 represents a possible impact location on passenger side portion 108 of instrument panel 106.

Figure 3:
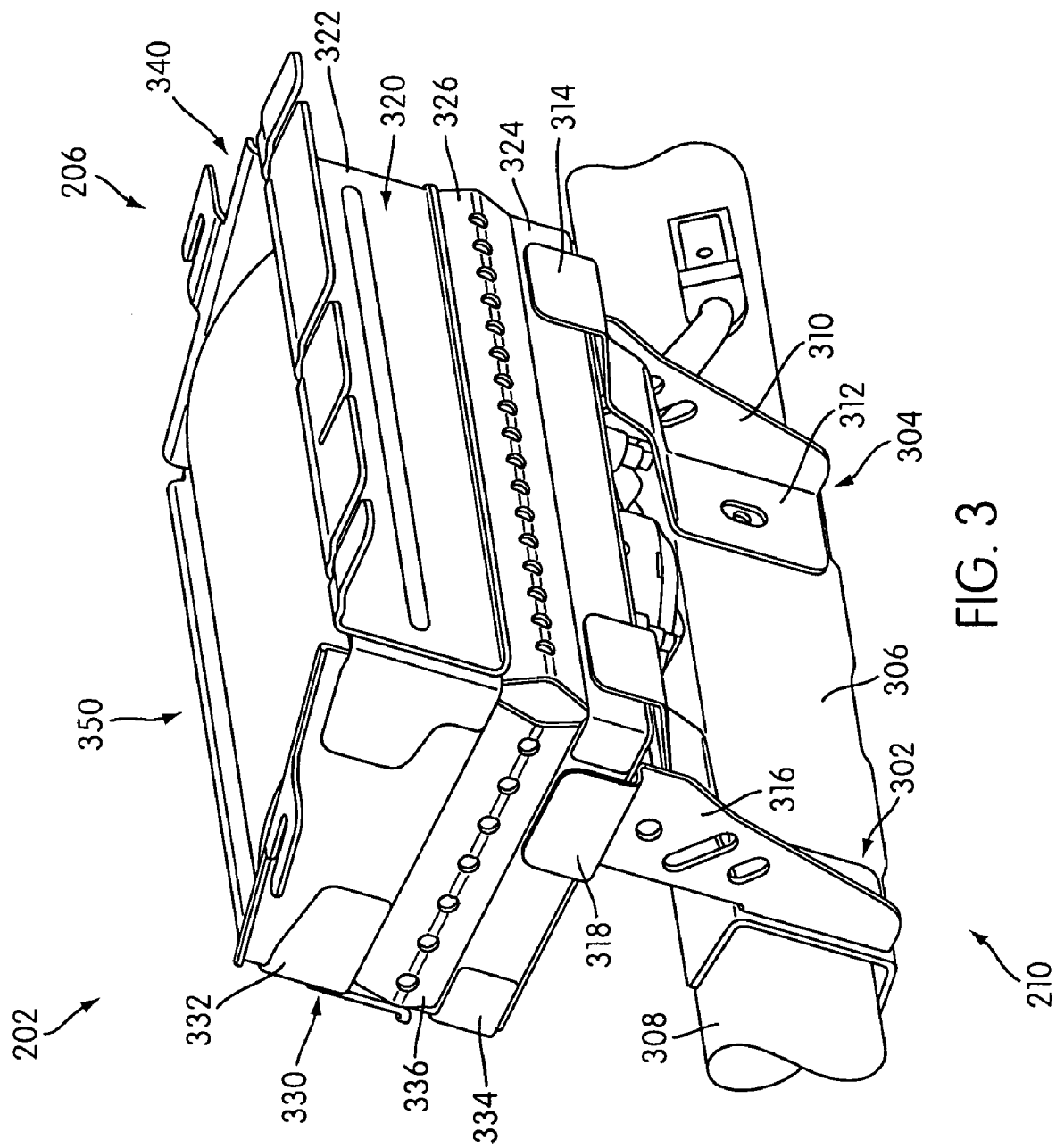
FIG. 3 is a front isometric view of a preferred embodiment of an airbag chassis.
Figure 4:
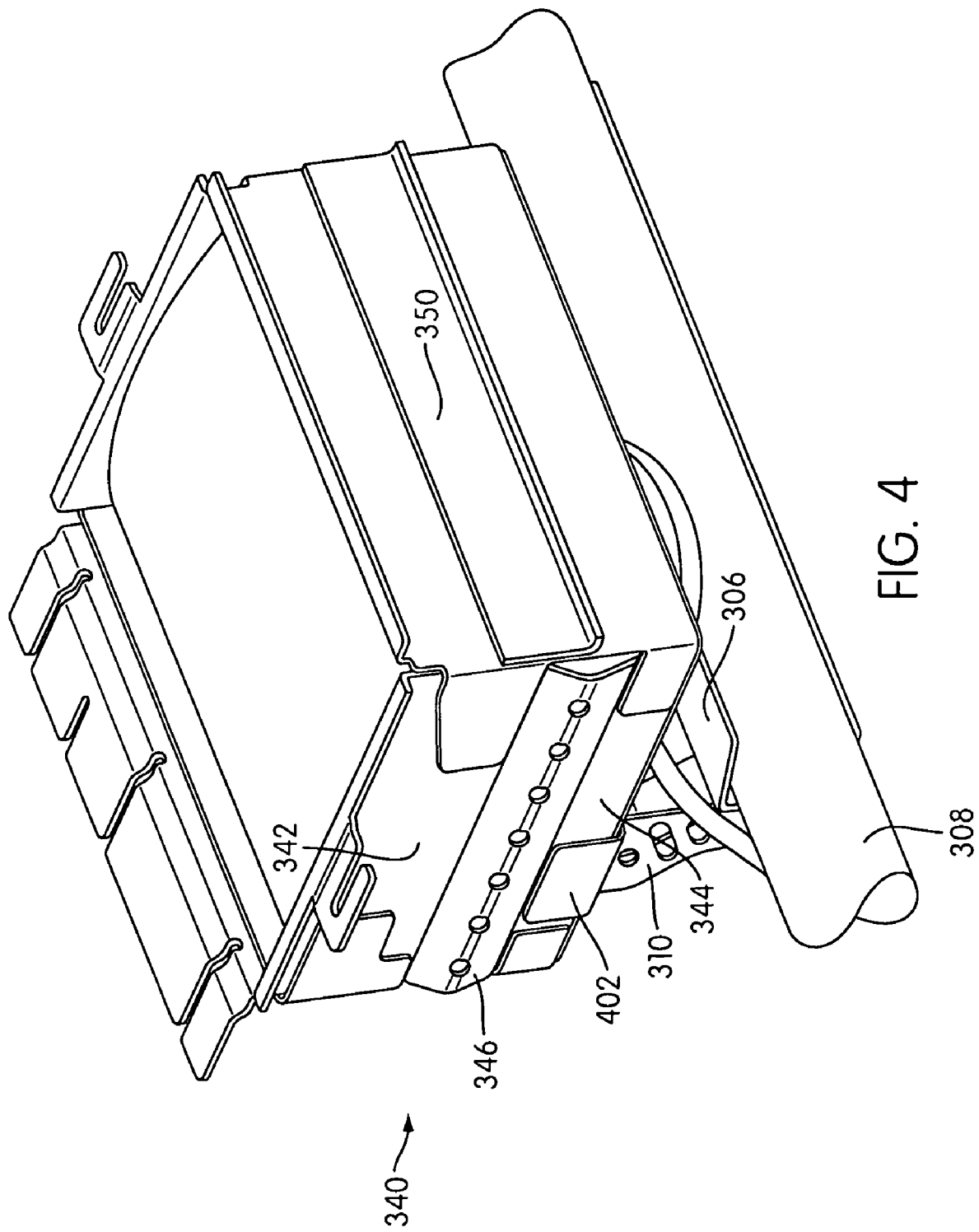
FIG. 4 is a rear isometric view of a preferred embodiment of an airbag chassis.

FIGS. 3 and 4 are enlarged forward and rear isometric views of SRS module 202. Lower mounting system 210 can be seen in FIG. 3. In a preferred embodiment, SRS module 202 is associated with cross member 308 of the motor vehicle. Preferably, a pair of mounting legs are used to attach SRS module 202 to cross member 308. In an exemplary embodiment, the mounting legs are attached to a mounting bracket 306 that is then attached to cross member 308. As shown in FIG. 3, SRS module 202 includes a first mounting leg 302 and a second mounting 304. Preferably, first mounting leg 302 is laterally spaced from second mounting leg 304.

Preferably, second mounting leg 304 includes a collapsible portion 310 and a cantilever portion 312. Preferably collapsible portion 310 is generally straight or upright from mounting bracket 306 to chassis 206. Collapsible portion 310 can include one or more perforations. These perforations can help to facilitate the collapse of second mounting leg 304 in the event of a collision. Preferably cantilever portion 312 is angled with respect to collapsible portion 310. In the exemplary embodiment shown in FIG. 3, cantilever portion 312 is normal to collapsible portion 310.

Cantilever portion 312 is attached to mounting bracket 306, and helps to support SRS module 202. Any kind of mechanical connection can be used. In the preferred embodiment, cantilever portion 312 includes a whole or aperture to receive a mechanical fastener that is used to attach cantilever portion 312 to mounting bracket 306.

Preferably, cantilever portion 312 includes one or more bends as shown in FIG. 3 that terminate with forward retaining flange 314. Preferably forward retaining flange 314 engages forward wall 320 of chassis 206. Preferably first mounting leg 302 is constructed in a similar manner as second mounting leg 304. The principles and features of second mounting leg 304 can be applied to first mounting leg 302. In the exemplary embodiment shown in FIG. 3, first mounting leg 302 is preferably a mirror image of second mounting leg 304. Like second mounting leg 304, first mounting leg 302 includes a collapsible portion 316. Preferably collapsible portion 316 terminates in a lateral retaining flange 318 that is configured to engage first lateral side wall 330 of chassis 206. Second mounting leg 304 preferably includes a similar lateral retaining flange 402 (see FIG. 4) on collapsible portion 310.

Chassis 206 is preferably formed of one or more walls. In the embodiment shown in FIGS. 3 and 4, chassis 206 includes a forward wall 320, first lateral side wall 330, second lateral side wall 340 and rear wall 350. Forward wall 320 includes an upper portion 322, a lower portion 324 and a deforming zone 326 disposed between upper portion 322 and lower portion 324. Similarly, first lateral side wall 330 includes a first upper portion 332, a first lower portion 334, and a first lateral deforming zone 336 disposed between first lateral upper portion 332 and first lateral lower portion 334. Preferably, second lateral side wall 340 is constructed in a manner similar to first lateral side wall 330, and includes second upper portion 342, second lower portion 344, and second deforming zone 346 disposed between second upper portion 342 and second lower portion 344.

Chassis 206 is preferably designed to deform or collapse during an impact. This helps to absorb energy from a passenger impact, which in turn, can reduce injuries to the passenger. Preferably chassis 206 is designed to collapse during an intermediate impact. That is, an impact that is severe enough to cause a passenger to contact instrument panel 106 (see FIG. 2) but is not severe enough to cause SRS module 202 to deploy an airbag. The various deforming zones disposed about chassis 206 assist chassis 206 in collapsing or deforming during an impact.

Figure 5:
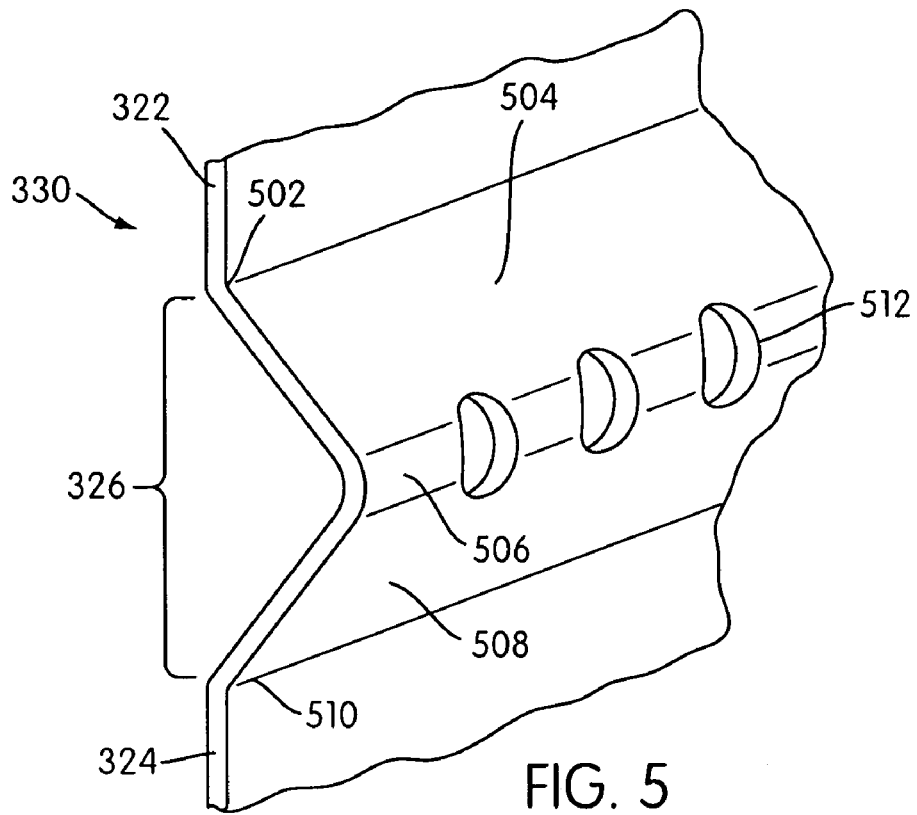
FIG. 5 is a schematic diagram of a preferred embodiment of a deformation zone.
Figure 6:
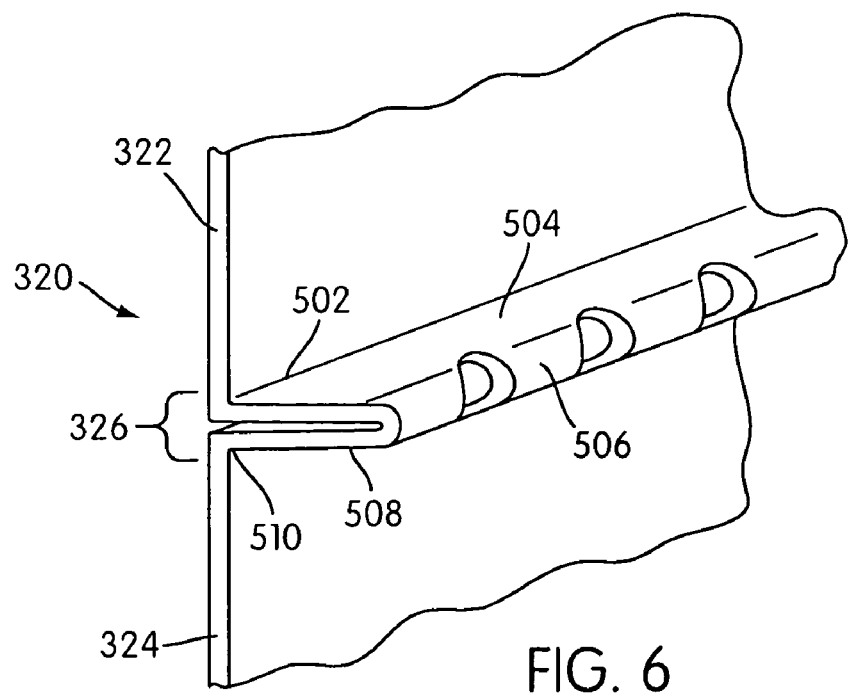
FIG. 6 is a schematic diagram of a preferred embodiment of a deformed deformation zone.

Referring to FIGS. 5 and 6 which are enlarged views of deforming zone 326, FIG. 5 shows the condition of deforming zone 326 prior to an impact, while FIG. 6 shows deforming zone 326 after an impact. Preferably deforming zone 326 includes a folded or bent shape. In a preferred embodiment shown in FIG. 5, deforming zone 326 includes a generally fan-folded shape.

As shown in FIG. 5, deforming zone includes first bend 502, first angled portion 504, second bend 506, and second angled portion 508. A third bend 510 is disposed between second angled portion 508 and lower portion 324. In the embodiment shown in FIG. 5, the various bends and angled portions form a triangular fan-fold shape. Some embodiments include provisions to modulate, control or adjust the deformation along one or more of the bends 502, 506, and/or 510. In some embodiments, holes are disposed along one or more of the bends 502, 506, and/or 510 to provide the ability to adjust the deformation characteristics.

In some embodiments, holes 512 are disposed on second bend 506. This optional feature can be used to modulate or control the bending or deforming characteristics of deforming zone 326. In some embodiments, holes 512 are laterally spaced and along second bend 506. The number, density, size and/or shape of holes 512 can be varied as needed. In some cases, additional holes or larger holes are provided. This can allow deforming zone 326 to bend or deform under lighter or smaller loads.

FIG. 6 shows the condition of forward wall 320 after an impact and after a deformation. As shown in FIG. 6, the angled portions have folded and upper portion 322 has been moved closer to lower portion 324 than prior to impact as shown in FIG. 5. The angle of second bend 506 has been decreased, and in some cases, the angle of second bend 506 is nearly zero, resulting in contact between first angled portion 504 and second angled 508. In other words, the fan-folded shape of FIG. 5 can be nearly flattened as shown in FIG. 6 in some embodiments and during some types of impact. This can also result in a reduction of the vertical height of deforming zone 326 as shown in FIG. 6.

The number, arrangement, design and location of deforming zones can be varied to achieve desired deformation or impact absorbing characteristics. The design and initial shape of a deforming zone can be modified in a number of ways. Referring to FIG. 5 as an example, first bend 502, second bend 506 and/or third bend 510 can all be adjusted or selected to vary the deformation characteristics. Also, the size of first angled portion 504 and/or second angled portion 508 can also be adjusted or selected to vary the deformation characteristics. In some embodiments, first angled portion 504 is of a different size than second angled portion 508. In other words, there is no requirement that the angled portions be similar, they can be dissimilar or asymmetrical.

Regarding the arrangement, location and number of deforming zones, in some embodiments, a deforming zone is provided on one of the walls of a chassis. In other embodiments, more than one wall of an airbag inflator chassis includes a deforming zone. And in other embodiments, all of the walls of an airbag inflator chassis include a deforming zone.

In those embodiments where more than one wall includes a deforming zone, the deforming zones on adjacent walls can be located to provide certain impact absorbing characteristics. In some cases, an airbag inflator chassis is designed to deform in a certain controlled manner and at a certain predetermined load. By carefully selecting the location, size and design of the various deforming zones associated with an airbag inflator chassis, the deformation of the airbag inflator chassis can be better controlled. In some cases, the chassis is designed to deform at a certain angle, in other cases, the chassis is designed so that the chassis achieves a predetermined shape or condition after deformation. The following embodiments illustrate ways in which the deforming zones can be arranged to achieve various different deformation characteristics.

Figure 7:
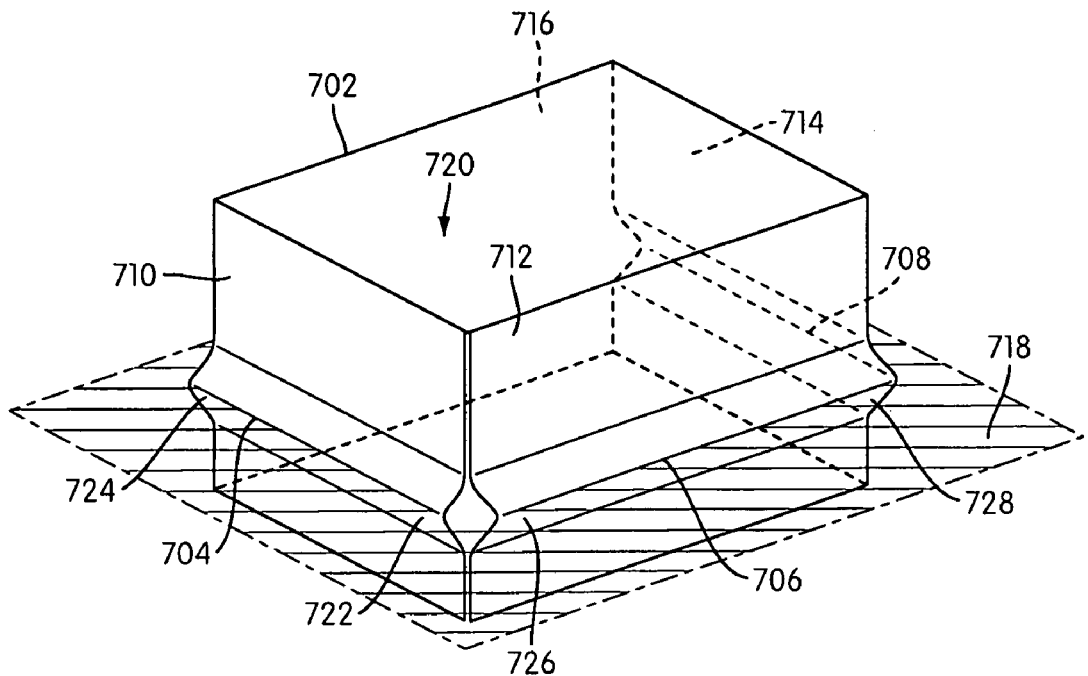
FIG. 7 is a schematic diagram of a preferred embodiment of an airbag chassis.

FIG. 7 is an embodiment of chassis 702 with a number of deforming zones 704, 706 disposed about a periphery of chassis 702. First deforming zone 704 is disposed on first side wall 710 and second deforming zone 706 is disposed on front wall 712. Chassis 702 can also preferably include additional deforming zones. In the embodiment shown in FIG. 7, third deforming zone 708 is disposed on second side wall 714. In this embodiment, chassis 702 is generally designed to deform so that the upper portion of chassis 702 above the deforming zones 704, 706 and 708 moves closer to the lower portion of chassis 702 below the deforming zones.

In order to allow chassis 702 to deform in the desired manner, one end of one of the deforming zones is located at a similar vertical location as one end of an adjacent deforming zone. Considering the example embodiment shown in FIG. 7, first deforming zone 704 includes first end 722 and second end 724. Second deforming zone 706 includes first end 726 and second end 728. In some embodiments, the ends of two adjacent deforming zones are generally aligned with respect to the axial direction of chassis 702.

In FIG. 7, it can be observed that first end 722 of first deforming zone 704 has an axial position that is similar to the axial position of first end 726 of second deforming zone 706.

Axially aligning the ends of two adjacent deforming zones can be used to control the deformation characteristics of chassis 702. In the embodiment shown in FIG. 7, the aligned ends of first deforming zone 704 and second deforming zone 706 helps the corner defined by first side wall 710 and front wall 712 to deform under a predetermined load.

In some embodiments, rear wall 716 may include a deforming zone. However, in other embodiments, rear wall 716 does not include a deforming zone. In the embodiment shown in FIG. 7, rear wall 716 does not include a deforming zone.

It can be observed in the embodiment shown in FIG. 7, that the various deforming zones 704, 706 and 708 are disposed in a certain pattern in relation with one another. In the embodiment shown in FIG. 7, it can be observed that the deforming zones 704, 706 and 708 are disposed on a common plane 718. This common plane 718 is generally parallel to the plane defined by the upper opening 720 of chassis 702. Common plane 718 can also be described as being normal or perpendicular to a central vertical axis of chassis 702.

Figure 8:
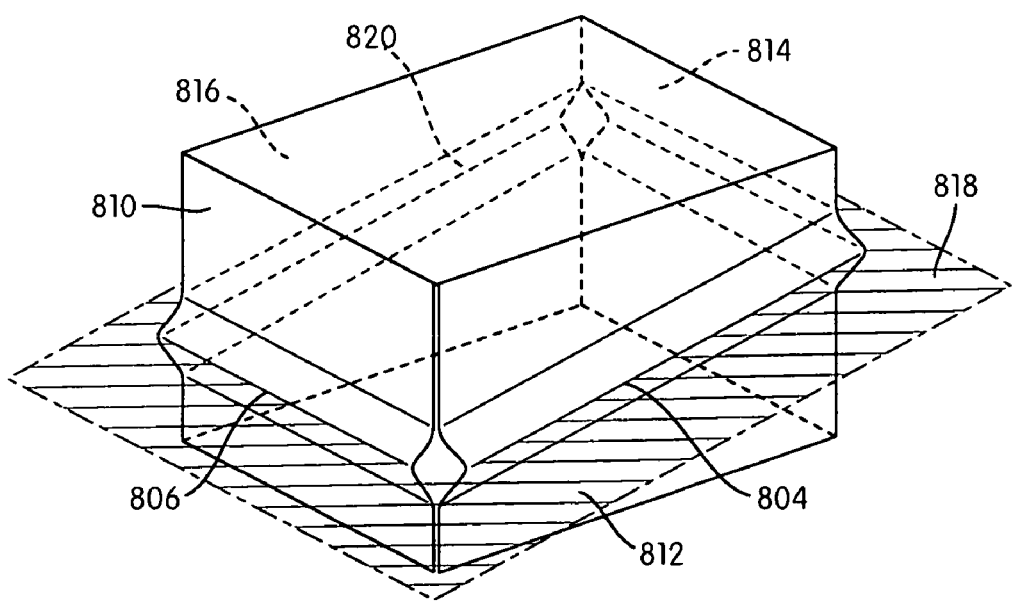
FIG. 8 is a schematic diagram of a preferred embodiment of an airbag chassis.

FIG. 8 shows an alternative embodiment where a first deformation zone 804 is angled with respect to second deformation zone 806. In some embodiments, opposite walls can include similar deformation zones. Thus, in some embodiments, second side wall 814 can include a deformation zone that is similar to second deformation zone 806 of first side wall 810. And, similarly, rear wall 816 can include deformation zone 820 that is similar to first deformation zone 804 disposed on front wall 812. It can be observed that the various deformation zones are disposed on a common plane 818. In the embodiment shown in FIG. 8, common plane 818 is not normal to a central axis of chassis 802 and is instead angled with respect to the central axis of chassis 802. The deformation zones shown in FIG. 8 may allow chassis 802 to deform at an angle.

Figure 9:
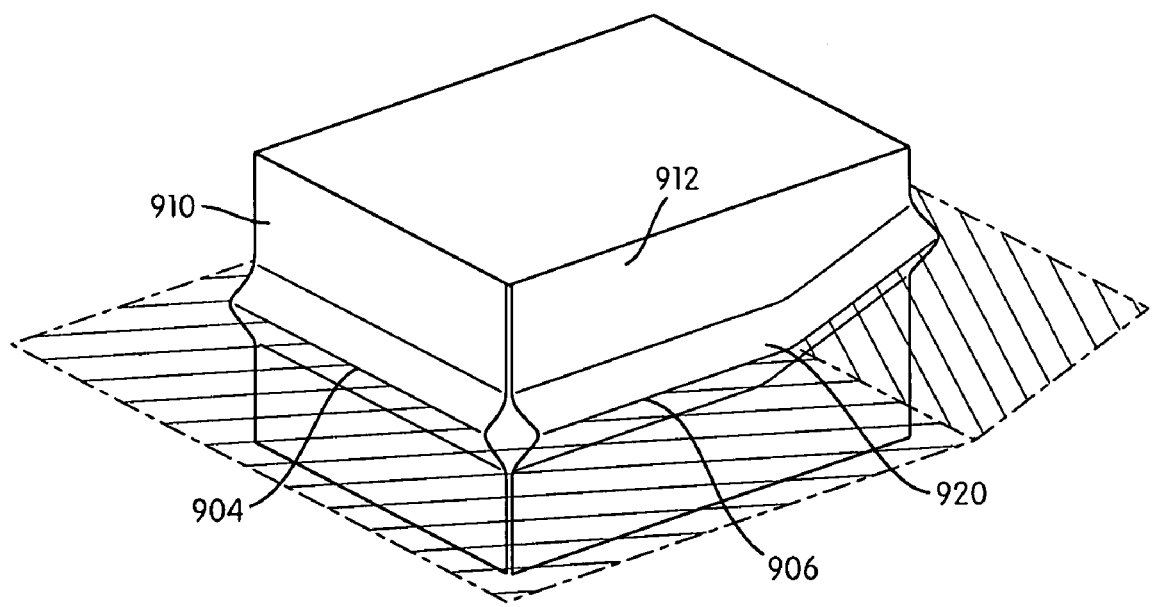
FIG. 9 is a schematic diagram of an alternative embodiment of an airbag chassis.

FIG. 9 shows another embodiment of a chassis 902. In this embodiment, first deforming zone 904 is disposed on first side wall 910 and second deforming zone 906 is disposed on front wall 912. As shown in FIG. 9, first deforming zone 904 is generally linear; however, second deforming zone 906 is not linear. Second deforming zone 906 includes a bend 920 along its length. This bend 920 can provide non-linear deformation characteristics for chassis 902 and allow chassis 902 to deform in irregular ways. In some cases, irregular deformation is desired. Also, as disclosed above, walls opposite to the ones shown in FIG. 9 can include similar deforming zones.

Figure 10:
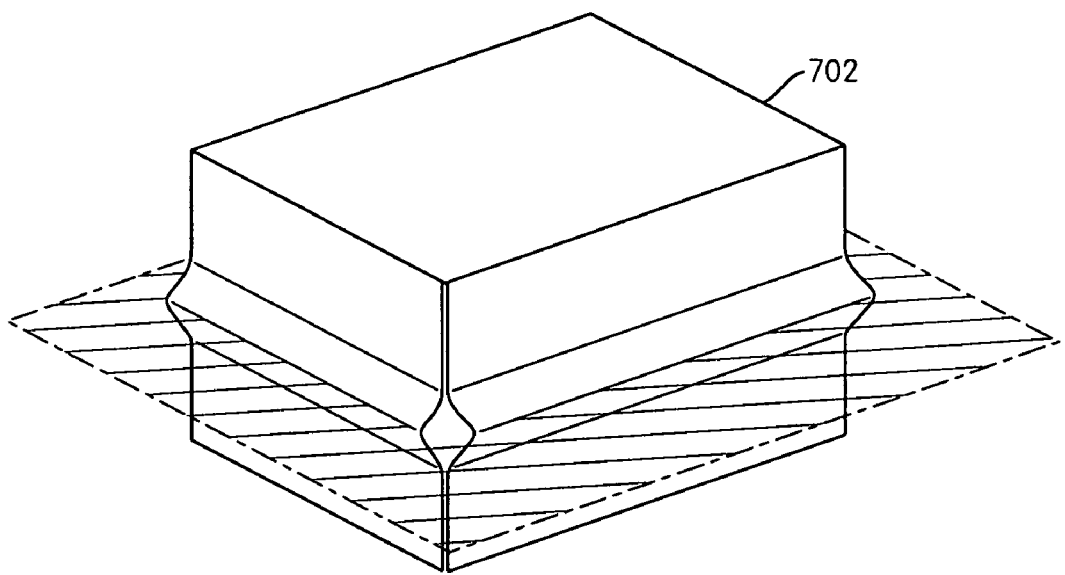
FIG. 10 is a schematic diagram of an isometric view of a preferred embodiment of an airbag chassis.
Figure 11:
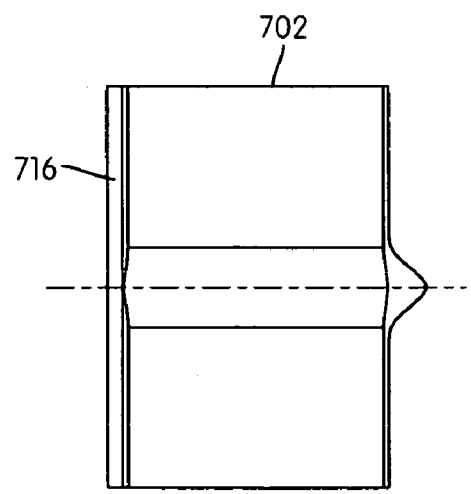
FIG. 11 is a schematic diagram of a side view of a preferred embodiment of an airbag chassis.
Figure 12:
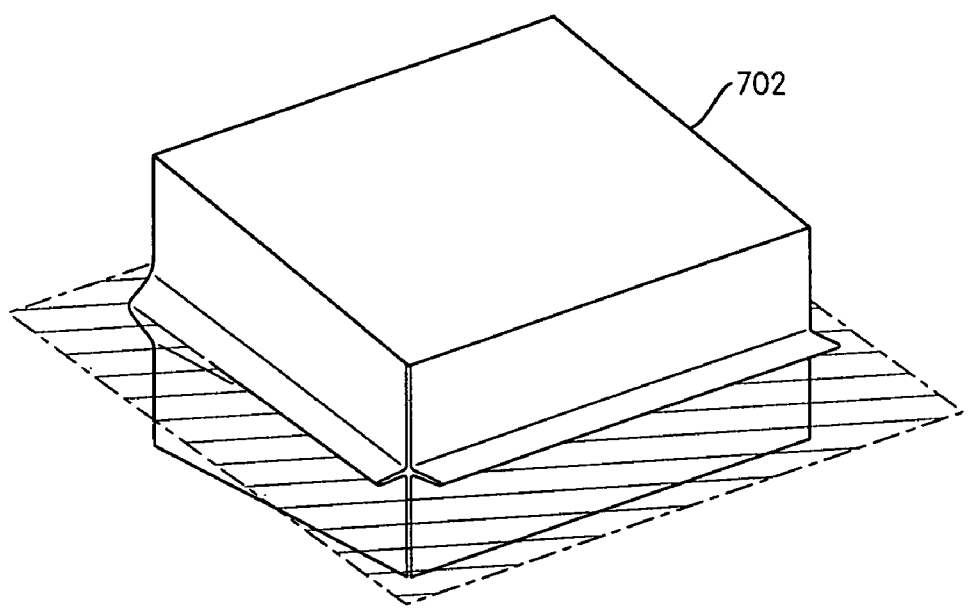
FIG. 12 is a schematic diagram of an isometric view of a preferred embodiment of an airbag chassis in a deformed condition.
Figure 13:
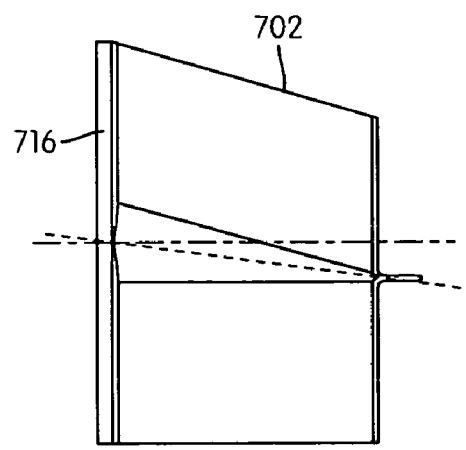
FIG. 13 is a schematic diagram of a side view of a preferred embodiment of an airbag chassis in a deformed condition.

FIGS. 10-13 demonstrate the deformation characteristics of an embodiment of chassis 702 shown in FIG. 7. Two possible embodiments are disclosed in FIG. 7. In one embodiment, rear wall 716 includes a deforming zone, and in another embodiment, rear wall 716 does not include a deforming zone. FIGS. 10-13 demonstrate the deforming characteristics of the embodiment where rear wall 716 does not include a deforming zone. Rear wall 716 is thus relatively rigid in the axial direction as compared to the other walls of chassis 702. FIGS. 10 and 11 show chassis 702 in its undeformed state and FIGS. 12 and 13 show chassis 702 in its deformed state.

Rigid rear wall 716 generally does not deform while the remaining walls deform under load. This arrangement of rigid and deforming walls allows chassis 702 to deform at an angle as shown in FIGS. 12 and 13.

Figure 14:
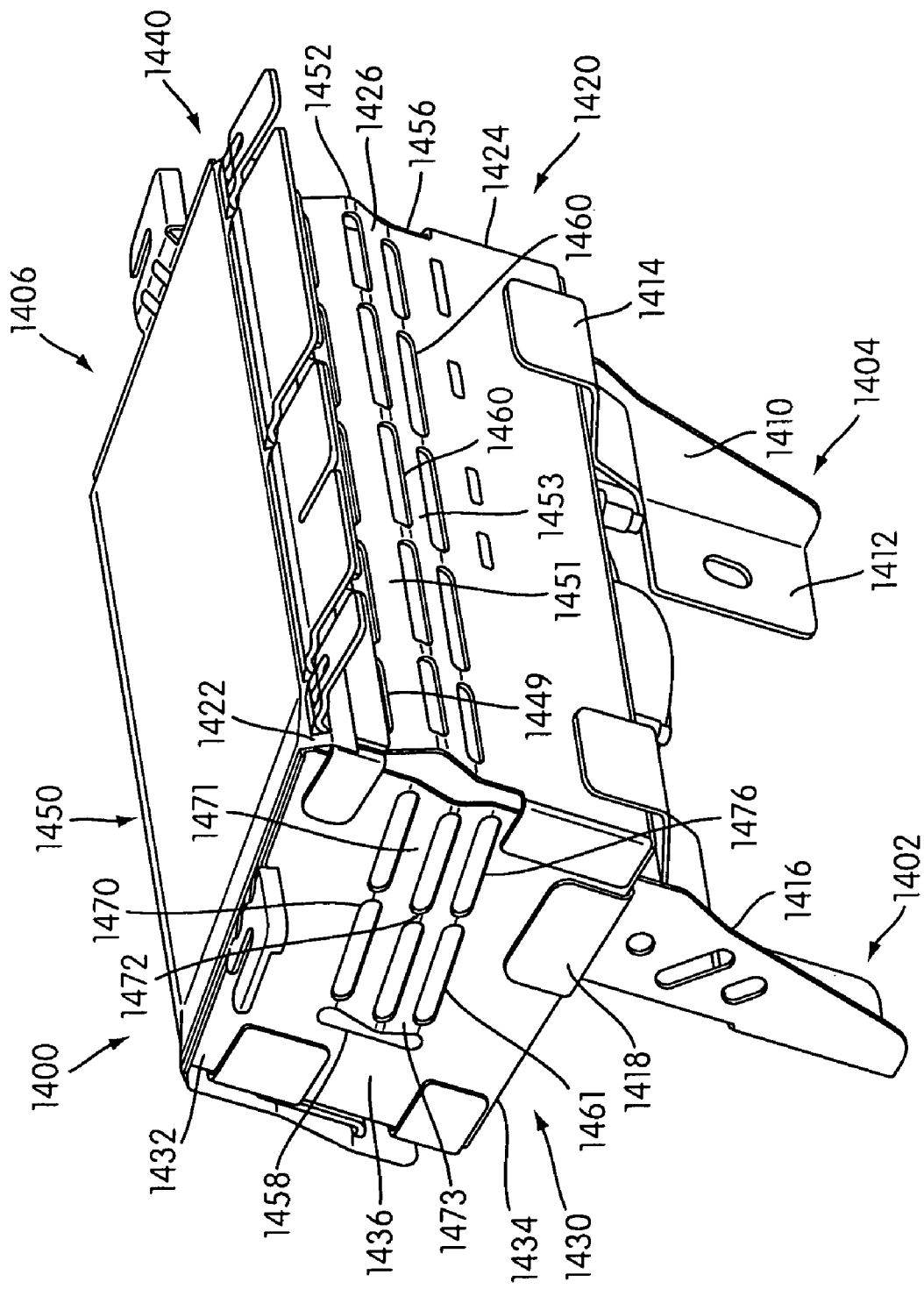
FIG. 14 is a schematic diagram of an isometric view of a preferred embodiment of an airbag chassis.

Another embodiment of an SRS module 1400 is shown in FIG. 14. FIG. 14 is an enlarged forward isometric view of SRS module 1400. Preferably, a pair of mounting legs are used to attach SRS module 1400 to the vehicle. As shown in FIG. 14, SRS module 1400 includes a first mounting leg 1402 and a second mounting 1404. Preferably, first mounting leg 1402 is laterally spaced from second mounting leg 1404.

Preferably, second mounting leg 1404 includes a collapsible portion 1410 and a cantilever portion 1412. Preferably collapsible portion 1410 is generally straight or upright from chassis 1406. Collapsible portion 1410 can include one or more perforations. These perforations can help to facilitate the collapse of second mounting leg 1404 in the event of a collision. Preferably cantilever portion 1412 is angled with respect to collapsible portion 1410. In the exemplary embodiment shown in FIG. 14, cantilever portion 1412 is normal to collapsible portion 1410.

Cantilever portion 1412 helps to support SRS module 1402. Any kind of mechanical connection can be used. In the preferred embodiment, cantilever portion 1412 includes a whole or aperture to receive a mechanical fastener that is used to attach cantilever portion 1412 to the vehicle.

Preferably, cantilever portion 1412 includes one or more bends as shown in FIG. 14 that terminate with forward retaining flange 1414. Preferably forward retaining flange 1414 engages forward wall 1420 of chassis 1406. Preferably first mounting leg 1402 is constructed in a similar manner as second mounting leg 1404. The principles and features of second mounting leg 1404 can be applied to first mounting leg 1402. In the exemplary embodiment shown in FIG. 14, first mounting leg 1402 is preferably a mirror image of second mounting leg 1404. Like second mounting leg 1404, first mounting leg 1402 includes a collapsible portion 1416. Preferably collapsible portion 1416 terminates in a lateral retaining flange 1418 that is configured to engage first lateral side wall 1430 of chassis 1406. Second mounting leg 1404 preferably includes a similar lateral retaining flange on collapsible portion 1410.

Chassis 1406 is preferably formed of one or more walls. In the embodiment shown in FIG. 14, chassis 1406 includes a forward wall 1420, first lateral side wall 1430, second lateral side wall 1440 and rear wall 1450. Forward wall 1420 includes an upper portion 1422, a lower portion 1424 and a deforming zone 1426 disposed between upper portion 1422 and lower portion 1424. Similarly, first lateral side wall 1430 includes a first upper portion 1432, a first lower portion 1434, and a first lateral deforming zone 1436 disposed between first lateral upper portion 1432 and first lateral lower portion 1434. Preferably, second lateral side wall 1440 is constructed in a manner similar to first lateral side wall 1430, and includes second upper portion, second lower portion, and second deforming zone disposed between second upper portion and second lower portion.

Chassis 1406 is preferably designed to deform or collapse during an impact. This helps to absorb energy from a passenger impact, which in turn, can reduce injuries to the passenger. Preferably chassis 1406 is designed to collapse during an intermediate impact. That is, an impact that is severe enough to cause a passenger to contact instrument panel 106 (see FIG. 2) but is not severe enough to cause SRS module 1400 to deploy an airbag. The various deforming zones disposed about chassis 1406 assist chassis 1406 in collapsing or deforming during an impact.

As shown in FIG. 14, deforming zone 1426 located along forward wall 1420 includes first bend 1449, first angled portion 1451, second bend 1452, second angled portion 1453, and third bend 1456. First bend 1449 is disposed between upper portion 1422 and first angled portion 1451. Second bend 1452 is disposed between first angled portion 1451 and second angled portion 1453. Third bend 1456 is disposed between second angled portion 1453 and lower portion 1424 of chassis 1406. In the embodiment shown in FIG. 14, the various bends and angled portions form a triangular fan-fold shape. Additionally, in the embodiment shown in FIG. 14, deforming zone 1436 located along first lateral side wall 1430 also includes first bend 1470, first angled portion 1471, second bend 1472, second angled portion 1473, and third bend 1476. First bend 1470 is displaced between upper portion 1436 and first angled portion 1471. Second bend 1472 is displaced between first angled portion 1471 and second angled portion 1473. Third bend 1476 is displaced between second angled portion 1473 and lower portion 1434 of chassis 1406. In the embodiment shown in FIG. 14, the various bends and angled portions form a triangular fan-fold shape.

As disclosed above, some embodiments include holes or perforations disposed in or around one or more deforming bones. Also, these holes can be placed along one or more bends associated with a particular deforming zone. In some cases, holes are disposed along every bend of a deforming zone. In the embodiment shown in FIG. 14, elongated holes 1460 are disposed on first bend 1449, second bend 1452, and third bend 1456. Elongated holes 1461 are also disposed on first bend 1470, second bend 1472, and third bend 1476. This optional feature can be used to modulate or control the bending or deforming characteristics of first deforming zone 1426 and second deforming zone 1436. In some embodiments, first elongated holes 1460 and second elongated holes 1461 are laterally spaced. The number, density, size and/or shape of first elongated holes 1460 and second elongated holes 1461 can be varied as needed. In some cases, additional holes or larger holes are provided. This can allow first deforming zone 1426 and second deforming zone 1436 to bend or deform under lighter or smaller loads. In a preferred embodiment, deforming zone 1436 does not span the entire width of first lateral side wall 1430.

In addition to the various elongated holes, some embodiments may include vertical hole 1458 located on first lateral side wall 1430. Vertical hole 1458 is disposed along a direction generally normal to second elongated holes 1461 and generally vertical with respect to chassis 1406. Vertical hole 1458 may allow chassis 1406 to deform only partially. Vertical hole 1458 can also be used to define the end of first deforming zone 1436. Thus, the portion of first lateral side wall 1430 disposed rearward of vertical hole 1458 is generally not configured to deform in the same way as the portion of first lateral side wall 1430 containing first deforming zone 1436.

This feature, in addition to the restriction of deforming zone 1436 to less than the full width of first lateral side wall 1430, may be useful as it allows chassis 1406 to deform partially, but allows a portion of chassis 1406 to remain in tact. Government regulations require a specified zone around the passenger in which any object placed within that zone cannot impart more than a specified load to a passenger in the case of impact. By allowing chassis 1406 to deform partially, the portion of chassis 1406 which is contained within the regulated zone is deformable so as not to impart more than the allowable load to a passenger during an impact. The region of chassis 1406 outside of this regulated zone can remain in tact and does not need to be deformable.

Second lateral side wall 1440 preferably contains the same features included in first lateral side wall 1430, and the features would be a mirror image of the features of first lateral side wall 1430.

Figure 15:
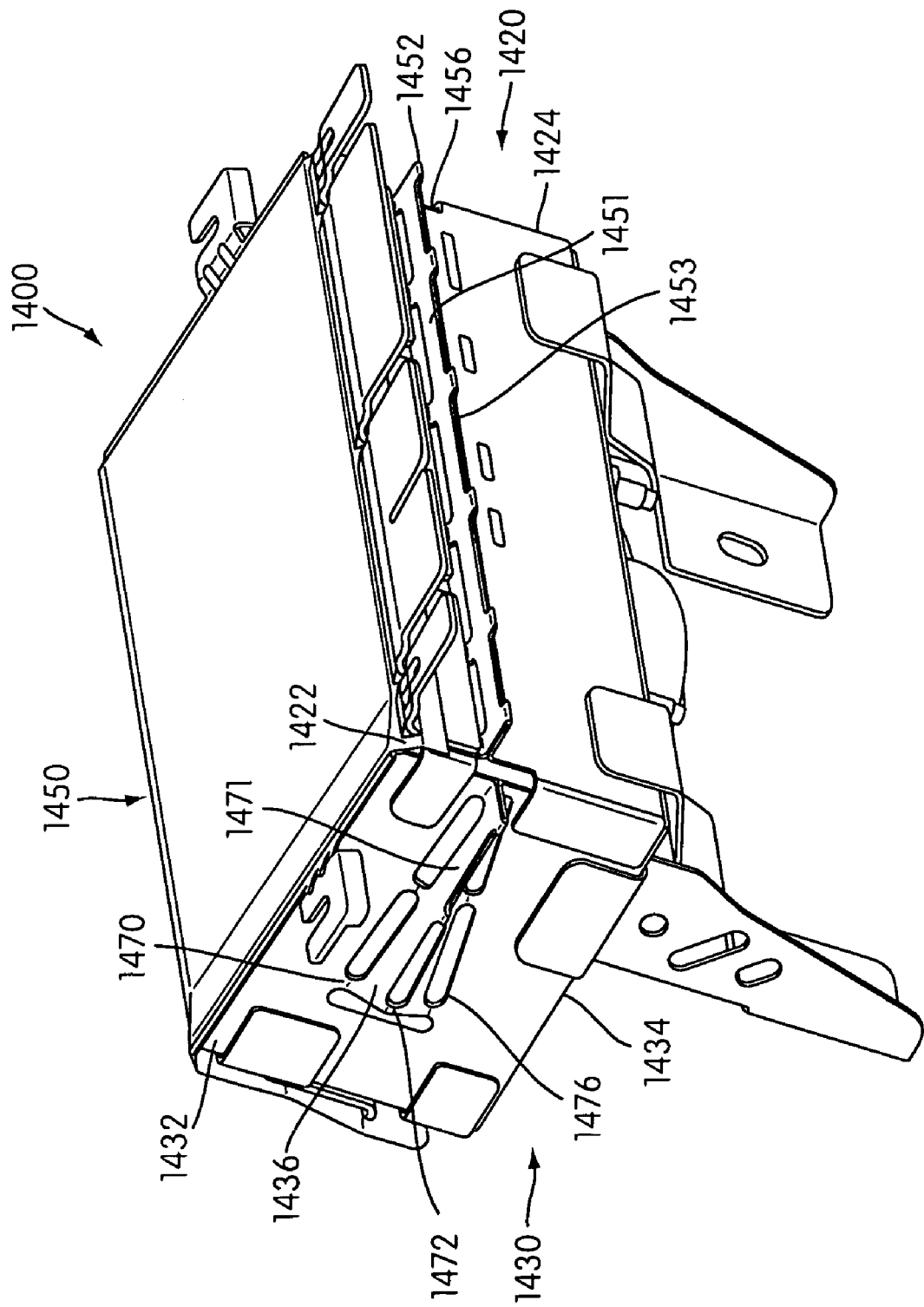
FIG. 15 is a schematic diagram of an isometric view of a preferred embodiment of an airbag chassis in a deformed condition.
Figure 16:
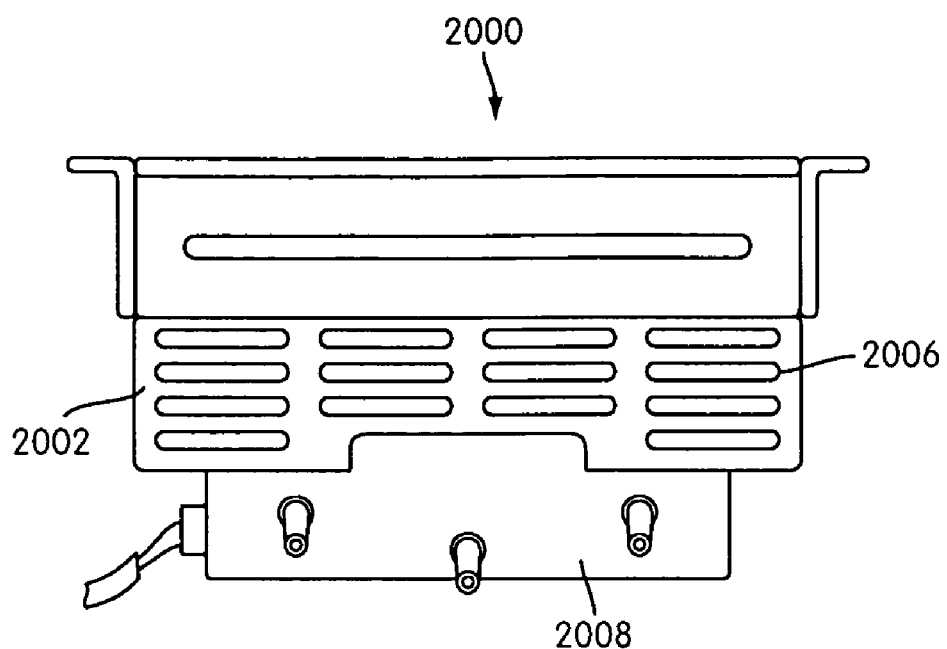
FIG. 16 is a schematic diagram of a front view of a related art airbag chassis.
Figure 17:
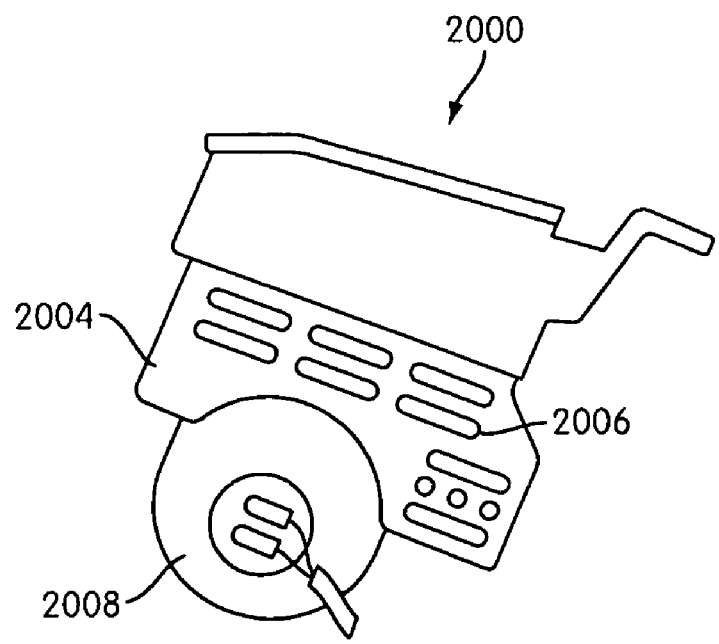
FIG. 17 is a schematic diagram of a side view of a related art airbag chassis.

FIG. 15 shows the condition of SRS module 1400 after an impact and after a deformation. In particular, FIG. 15 shows the condition of forward wall 1420, and first lateral side wall 1430 after an impact and after a deformation. As shown in FIG. 15, the angled portions have folded and along forward wall 1420, and upper portion 1422 has been moved closer to lower portion 1424 than prior to impact. Along first lateral side wall 1430, upper portion 1432 has been moved closer to lower portion 1434 than prior to impact. The angles of first bend 1449, second bend 1452, and third bend 1456 have been decreased, and in some cases, the angles of first bend 1449, second bend 1452, and third bend 1456 are nearly zero, resulting in contact between first angled portion 1451 and second angled portion 1453. In other words, the fan-folded shape of deforming zone 1426 can be nearly flattened as shown in FIG. 15 in some embodiments and during some types of impact. This can also result in a reduction of the vertical height of deforming zone 1426 as shown in FIG. 15.

FIG. 15 also shows the condition of first lateral side wall 1430 after an impact and after a deformation. Along first lateral side wall 1430, upper portion 1432 has been moved closer to lower portion 1434 than prior to impact. The angles of first bend 1470, second bend 1472, and third bend 1476 have been decreased, and in some cases, the angles of first bend 1470, second bend 1472, and third bend 1476 are nearly zero, resulting in contact between first angled portion 1471 and second angled portion 1473. In other words, the fan-folded shape of deforming zone 1436 can be nearly flattened as shown in FIG. 15 in some embodiments and during some types of impact. This can also result in a reduction of the vertical height of deforming zone 1436 as shown in FIG. 15.

In this embodiment, deforming zone 1436 does not result in similar deformation of the rear portion of first lateral side wall 1430. Because of vertical hole 1458 the portion of first lateral wall 1430 disposed between vertical hole 1458 and the edge of first lateral wall 1430 closest to rear wall 1450 is either not deformed or deformed differently after impact. The second lateral side wall will generally deform in a manner similar to first lateral side wall 1430.

The number, arrangement, design and location of deforming zones can be varied to achieve desired deformation or impact absorbing characteristics. The design and initial shape of a deforming zone can be modified in a number of ways. Referring to FIG. 14 as an example, first bend 1449, second bend 1452 and/or third bend 1456 can all be adjusted or selected to vary the deformation characteristics. Also, the size of first angled portion 1451 and/or second angled portion 1453 can also be adjusted or selected to vary the deformation characteristics. In some embodiments, first angled portion 1451 is of a different size than second angled portion 1453. In other words, there is no requirement that the angled portions be similar, they can be dissimilar or asymmetrical.

Regarding the arrangement, location and number of deforming zones, in some embodiments, a deforming zone is provided on one of the walls of a chassis. In other embodiments, more than one wall of an airbag inflator chassis includes a deforming zone. And in other embodiments, all of the walls of an airbag inflator chassis include a deforming zone.

In those embodiments where more than one wall includes a deforming zone, the deforming zones on adjacent walls can be located to provide certain impact absorbing characteristics. In some cases, an airbag inflator chassis is designed to deform in a certain controlled manner and at a certain predetermined load. By carefully selecting the location, size and design of the various deforming zones associated with an airbag inflator chassis, the deformation of the airbag inflator chassis can be better controlled. In some cases, the chassis is designed to deform at a certain angle, in other cases, the chassis is designed so that the chassis achieves a predetermined shape or condition after deformation. The following embodiments illustrate ways in which the deforming zones can be arranged to achieve various different deformation characteristics.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. An inflatable restraint module configured for mounting in an interior of a motor vehicle comprising:
    a chassis retaining an inflator, and connected to a mounting system;
    the chassis including a forward side wall disposed closer to an anticipated impact location than a rear side wall, a first lateral side wall, a second lateral side wall, and the rear side wall disposed opposite the forward side wall;
    wherein the forward side wall is disposed at an angle with respect to the first lateral side wall;
    wherein a first portion of the forward side wall is detached from a first portion of the first lateral side wall to form a gap between the forward side wall and the first lateral side wall;
    the forward side wall including a forward deforming zone disposed between an upper portion of the forward side wall and a lower portion of the forward side wall;
    wherein the forward deforming zone is aligned with the gap;
    wherein the forward deforming zone includes a first angled portion and a second angled portion; and
    wherein the forward deforming zone is configured to assist the forward side wall in collapsing during an impact by moving the first angled portion toward the second angled portion.

2. The inflatable restraint module according to claim 1, wherein the upper portion of the forward side is generally more rigid than the forward deforming zone.

3. The inflatable restraint module according to claim 1, wherein the first lateral side wall includes a first lateral upper portion and a first lateral deforming zone.

4. The inflatable restraint module according to claim 3, wherein the first lateral deforming zone is located in a similar vertical position as the forward deforming zone.

5. The inflatable restraint module according to claim 3, wherein the second lateral side wall includes a second lateral upper portion and a second lateral deforming zone.

6. The inflatable restraint module according to claim 5, wherein the first lateral deforming zone, the second lateral deforming zone and the forward lateral deforming zone are located in substantially the same plane.

7. An inflatable restraint module configured for mounting in an interior of a motor vehicle comprising:
    a chassis retaining an inflator, and connected to a mounting system;
    the chassis including a first wall and a second wall, angled with respect to the first wall;
    the first wall including a first collapsible portion with first and second ends;
    the second wall including a second collapsible portion with first and second ends; and
    wherein the first end of the first collapsible portion is adjacent to the first end of the second collapsible portion;
    wherein the first end of the first collapsible portion has a generally similar axial position with respect to the chassis as the first end of the second collapsible portion; and
    wherein the first collapsible portion is configured to increase the deformability of the first wall and the second collapsible portion is configured to increase the deformability of the second wall.

8. The inflatable restraint module according to claim 7, wherein the second side wall includes a generally straight deforming zone.

9. The inflatable restraint module according to claim 7, wherein the second side wall includes a deforming zone including an angle.

10. The inflatable restraint module according to claim 7 further comprising a third wall angled with respect to the first wall,
    the third wall including a third collapsible portion with first and second ends, wherein the third collapsible portion is configured to increase the deformability of the third wall, and
    wherein the second end of the first collapsible portion is adjacent to the first end of the third collapsible portion.

11. The inflatable restraint module according to claim 7, wherein an upper portion of the first wall is generally more rigid than the first deforming zone.

12. The inflatable restraint module according to claim 11, wherein an upper portion of the second wall is generally more rigid than the second deforming zone.

13. The inflatable restraint module according to claim 7, wherein the first deforming zone and the second deforming zone are located in substantially the same plane.

14. The inflatable restraint module according to claim 13, wherein the plane is generally normal with respect to an axis of the chassis.

15. The inflatable restraint module according to claim 13, wherein the plane is generally angled with respect to an axis of the chassis.

16. A chassis for an inflator comprising:
    a rear side wall;
    a forward side wall;
    the rear side wall disposed opposite the forward side wall;
    a lateral side wall extending between the rear side wall and the forward side wall, wherein the rear side wall, the forward side wall, and the lateral side wall define a chamber that contains an airbag;
    the forward side wall including a forward deforming zone comprising a first characteristic configured to increase the deformability of the forward side wall during an intermediate impact;
    the lateral side wall including a lateral deforming zone comprising a second characteristic configured to increase the deformability of the lateral side wall during an intermediate impact;
    wherein the chassis has an initial shape prior to the intermediate impact;
    wherein the chassis has a predetermined shape after the intermediate impact;
    wherein the first characteristic and second characteristic are selected to achieve the predetermined shape; and
    wherein the first characteristic and the second characteristic are configured so that any bent material of the forward deforming zone and the lateral deforming zone extends away from the airbag to achieve the predetermined shape.

17. The chassis of claim 16, wherein at least one of the first characteristic and the second characteristic comprises a fan-folded shape.

18. The chassis of claim 17, wherein the fan-folded shape comprises a first bend, a second bend, a third bend, a first angled portion extending between the first bend and the second bend, and a second angled portion extending between the second bend and the third bend.

19. The chassis of claim 18, wherein a hole is disposed on the second bend.

20. The chassis of claim 16, wherein the rear side wall first portion of the forward deforming zone is positioned along the forward side wall on a first plane and a second portion of the forward deforming zone is positioned along the forward side wall on a second plane. wherein the first plane and the second plane are different.

* * * * *